(12) United States Patent
Holzapfel et al.

(10) Patent No.: US 7,161,139 B2
(45) Date of Patent: Jan. 9, 2007

(54) POSITION-MEASURING SYSTEM AND METHOD FOR OPERATING A POSITION-MEASURING SYSTEM

(75) Inventors: Wolfgang Holzapfel, Obing (DE); Karsten Saendig, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 185 days.

(21) Appl. No.: 10/488,640

(22) PCT Filed: Sep. 2, 2002

(86) PCT No.: PCT/EP02/09767

§ 371 (c)(1),
(2), (4) Date: Mar. 3, 2004

(87) PCT Pub. No.: WO03/021185

PCT Pub. Date: Mar. 13, 2003

(65) Prior Publication Data

US 2004/0232320 A1 Nov. 25, 2004

(30) Foreign Application Priority Data

Sep. 4, 2001 (DE) ................. 101 43 185

(51) Int. Cl.
*G01D 5/34* (2006.01)
*G01D 5/36* (2006.01)
*G01B 11/24* (2006.01)
*G01B 11/14* (2006.01)

(52) U.S. Cl. ............... 250/231.13; 250/231.14; 250/237 G; 356/614; 356/616

(58) Field of Classification Search ...............
250/231.13–231.18, 237 G; 356/614, 616, 356/617, 496–499; 341/11, 13, 31; 33/1 N, 33/1 PT See application file for complete search history.

(56) References Cited

U.S. PATENT DOCUMENTS

| 3,985,448 A | 10/1976 | Wiklund et al. |
| 4,263,506 A | 4/1981 | Epstein |
| 4,866,269 A | 9/1989 | Wlodarczyk et al. |
| 5,064,290 A | 11/1991 | McMurtry et al. |

(Continued)

FOREIGN PATENT DOCUMENTS

DE 35 36 466 4/1987

(Continued)

*Primary Examiner*—Stephone B. Allen
*Assistant Examiner*—Suezu Ellis
(74) *Attorney, Agent, or Firm*—Kenyon & Kenyon LLP

(57) ABSTRACT

In a position measuring system and a method for operating such a position measuring system, e.g., for the purpose of producing at least one reference pulse signal, the position measuring system includes a gauge with a track in which a periodic incremental scale is disposed and extends in one direction of measurement. The track displays a discontinuity with respect to an optical property in at least one defined reference position. The position measuring system further a scanner unit that may be displaced across a predetermined measuring length relative to the gauge in the direction of measurement and that is provided, in addition to a light source, with a plurality of detector elements for the photoelectric scanning of the incremental scale. In adjacent sections of the measuring length, the incremental scale has different transverse substructures that deflect incident ray beams in first and second directions in space. Reference pulse detectors are disposed in the various directions in space on the scanning unit end and are supplied with partial reference pulse signals or area signals which are processed to give the reference pulse signal.

22 Claims, 8 Drawing Sheets

U.S. PATENT DOCUMENTS

| | | |
|---|---|---|
| 5,637,868 A | 6/1997 | Tamiya |
| 5,648,658 A | 7/1997 | Holzapfel et al. |
| 6,198,534 B1 * | 3/2001 | Hofer et al. ................ 356/399 |
| 6,392,224 B1 * | 5/2002 | Holzapfel et al. ..... 250/231.13 |
| 6,642,507 B1 * | 11/2003 | Kataoka ................ 250/231.13 |

FOREIGN PATENT DOCUMENTS

| | | |
|---|---|---|
| DE | 41 11 873 | 10/1992 |
| JP | 7-270189 | 10/1995 |
| JP | 11-153454 | 6/1999 |
| WO | WO 89/05440 | 6/1989 |
| WO | WO 9908074 A1 * | 2/1999 |

* cited by examiner

POSITION-MEASURING SYSTEM AND METHOD FOR OPERATING A POSITION-MEASURING SYSTEM

FIELD OF THE INVENTION

The present invention is directed to a position-measuring device and to a method for operating a position-measuring device.

BACKGROUND INFORMATION

In addition to incremental signals with respect to the relative displacement of two objects movable relative to each other, conventional position-measuring devices often supply so-called reference-pulse signals as well. Given a defined relative position of the objects movable relative to each other, an exact absolute reference of the position measurement may be produced based on these signals. To generate the reference-pulse signals, fields having reference markings are arranged on sides of the scale of the position-measuring device at one or more locations. A number of conventional possibilities exist regarding the arrangement of the reference markings on the scale.

Thus, for example, in U.S. Pat. No. 4,263,506, it is described to arrange the reference markings on the scale laterally adjacent to the scale-division track having the incremental graduation. The problem in that case, however, is that in the event the scale and scanning unit twist about an axis perpendicular to the scale plane or scanning plane, as a rule, the exact allocation of the reference-pulse signal to a specific period of the incremental signals is no longer ensured.

In addition, it is also possible to integrate the reference markings directly into the track having the incremental graduation, as is described, for instance, in U.S. Pat. No. 3,985,448, and to then derive the reference-pulse signal directly from the incremental graduation. Such a system offers special advantages with respect to the allocation of the reference-pulse signal to the incremental signals, since even if the scale and scanning unit twist as mentioned above, the correct allocation always remains ensured. For example, one or more omitted bars or marks of the incremental graduation may be used as reference marking at the desired reference position on the scale in the incremental graduation, that is to say, the track having the incremental graduation has a discontinuity with respect to an optical property at one or more defined locations, in order to produce the reference-pulse signal.

Further variants regarding the integration of reference markings into the track having the incremental graduation are also described in German Published Patent Application No. 35 36 466 or U.S. Pat. No. 4,866,269. These documents propose forming the reference markings as a periodic mark sequences or bar sequences in the incremental graduation, or else to utilize regions having altered optical properties as reference markings which differ from the remaining incremental graduation.

Basically, however, with the integration of reference markings into the incremental graduation, it may be problematic that the periodic incremental signal is also thereby disturbed at this location, since one is forced to ensure sufficient detection reliability for the reference-pulse signal. Particularly if a high interpolation of the incremental signal is desired, which in turn assumes the best possible signal quality of the same, difficulties result when the incremental signal at the reference position deviates markedly from an ideal signal form.

Furthermore, in German Published Patent Application No. 41 11 873, it is described to generate a reference-pulse signal from a track that is arranged on the scale merely for generating region information, i.e., to identify precisely on what side of a scale-reference position a scanning unit is located. At the junction between two different regions, a reference-pulse signal can also be generated from the corresponding region signals. However, in this case, the correct detection of a reference-pulse signal at this location is problematic.

SUMMARY

Therefore, it is an aspect of the present invention to provide a position-measuring device which may make it possible to generate a reference-pulse signal from a track having an incremental graduation. In so doing, as aspect is to disturb the generation of the incremental signal as little as possible.

Another aspect of the present invention is to provide a method for operating a position-measuring device, the method being suitable, e.g., for correctly generating a reference-pulse signal from a track using region signals.

The foregoing may be achieved by providing a position measuring device as described herein.

Example embodiments of the position-measuring device according to the present invention are described below.

Example embodiments of the method according to the present invention for operating a position-measuring device are also described below.

According to an example embodiment of the present invention, in the position-measuring device, different sections of the incremental graduation along the measurement path now have different periodic transverse substructures which deflect the incident beams of rays in various spatial directions.

Different transverse substructures having different deflection effects are allocated to each section. In the junction region between adjacent sections, a discontinuity with respect to the optical deflection effect of the transverse substructures exists which is used for producing the reference-pulse signal at this location, i.e., the reference position. To this end, at least two reference-pulse detector elements are disposed in the various spatial directions on sides of the scanning unit. Partial reference-pulse signals are applied to the reference-pulse detector elements which, when processed, result in the desired reference-pulse signal.

This manner of generating the reference-pulse signal may ensure that the periodicity of the periodic incremental graduation is also not disturbed at the reference position, and therefore the resulting incremental signal is not disturbed by the generation of the reference-pulse signal either. In particular, the incremental signal also may suffer no unwanted intensity losses because of the generation of the reference-pulse signal.

In addition to a reference-pulse signal, which may be derived from the incremental graduation, with respect to small size of the position-measuring device and uncritical mounting, further advantages may be achieved on the basis of the measures described herein.

Thus, without further additional measures, it is may be possible to produce information from the partial reference-pulse signals about precisely on which side of the reference marking or in which region the scanning unit is located.

Therefore, the partial reference-pulse signals may also be evaluated as so-called region signals. Moreover, due to the manner in which the partial reference-pulse signals are processed, a desired width of the resulting square-wave reference-pulse signal may be set in a defined manner and matched to the signal period of the incremental signal.

A reference-pulse signal is able to be produced in the case of generating at least one first and one second region signal, and from the comparison carried out between the first region signal or further region signals derived therefrom, and the second region signal or further region signals derived therefrom.

The foregoing and below-described measures may be utilized both in rotary and in linear position-measuring devices.

In addition, both incident-light position-measuring devices and transmitted-light position-measuring devices may be provided.

In an example embodiment of the present invention, a position-measuring device for generating periodic incremental signals and at least one reference-pulse signal includes: a scale including a track extending in a measuring direction, a periodic incremental graduation arranged in the track, the periodic incremental graduation including a specific incremental graduation period, the track including, in at least one defined reference position, a discontinuity with respect to an optical property to generate a reference-pulse signal; and a scanning unit movable relative to the scale in the measuring direction over a specific measurement path, the scanning unit including a light source and a plurality of detector elements configured to photoelectrically scan the incremental graduation. In a first section of the measurement path, the incremental graduation includes a first transverse substructure configured to deflect incident beams of ray into at least a first spatial direction, and in a second section of the measurement path, the incremental graduation includes a second transverse substructure configured to deflect incident beams of rays into at least a second spatial direction different from the first spatial direction, a discontinuity with respect to optical deflection action of the transverse substructures of the incremental graduation resulting in a junction region between the first section and the second section. The plurality of detector elements includes at least one reference-pulse detector element arranged on sides of the scanning unit in the spatial directions and arranged to receive partial reference-pulse signals, the partial reference-pulse signals processed to yield the reference-pulse signal.

In an example embodiment of the present invention, a method for operating a position-measuring device includes: deriving first and second region signals from a track on a scale, the region signals indicating a relative position of a scanning unit in relation to a reference position, the scanning unit movable with respect to the scale, the reference position defined by a junction region in at least one region signal; comparing one of the first region signal and further region signals derived from the first region signals and one of the second region signal and further region signals derived from the second region signal; and generating a reference-pulse signal at least one reference position along measurement path based on the comparing step.

Further aspects of the present invention and details pertaining thereto are derived from the following description of an exemplary embodiment, on the basis of the appended Figures.

DETAILED DESCRIPTION

Figure 1:
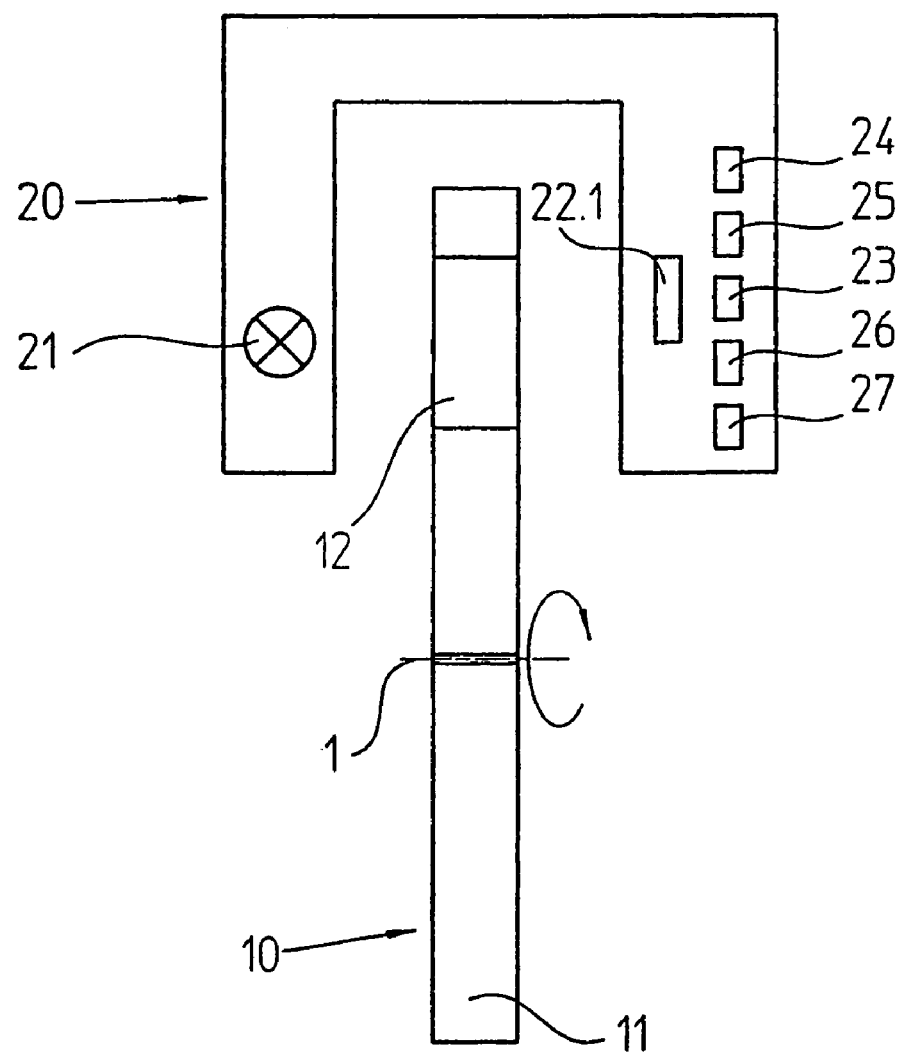
FIG. 1 shows a side view of an exemplary embodiment of the position-measuring device according to the present invention.

FIG. 1 schematically depicts an exemplary embodiment of the position-measuring device according to the present invention in a sectional view. The variant of the position-measuring device shown is used for measuring rotary movements of two objects, movable relative to each other, about axis of rotation 1, and includes a scale 10 as well as a scanning unit 20, which in each case are joined to one of the two objects. In the present case, measuring direction x in which the two objects are movable relative to each other is oriented in a rotationally symmetrical manner with respect to axis of rotation 1.

Scale 10 is formed as a graduated disk made up of a disk-shaped carrier element 11 upon which a track 12 is disposed having an incremental graduation in the shape of a circle in the circumferential direction. The incremental graduation is made up of a sequence of subregions having different optical properties and arranged periodically with incremental graduation period $TP_{INC}$ in measuring direction x. The subregions have a longitudinal extension in a direction y that is oriented perpendicular to measuring direction x. Reference is made to the following description of FIGS. 3a and 3b for the specific design of the incremental graduation.

In the present example embodiment, the incremental graduation is formed as a transmitted-light phase grating or graduation, that is to say, the successive subregions each have a different phase-shifting optical effect on the beams of rays passing through. Carrier element 11 is made of glass. A light source 21 is positioned on sides of scanning unit 20. Moreover, scanning unit 20 includes scanning graduations 22.1. 22.2, as well as a plurality of detector elements 23 to 27 which are used for generating different scanning signals. Reference numeral 23 designates an incremental-signal detector element, indicated only schematically, that is used for detecting periodic incremental signals INC. Incremental-signal detector element 23 may be designed in a conventional manner as a so-called structured detector array, or else as a system having a plurality of individual photo elements.

With the aid of incremental-signal detector element 23, four incremental signals each phase-shifted by 90° or three incremental signals each phase-shifted by 120° may be generated in a conventional manner, which in turn are interconnected to form two incremental output signals phase-shifted by 90°. For the sake of simplicity, however, in the following, the talk shall be only of periodic incremental signals INC.

Reference numerals 24, 25, 26, 27 designate the reference-pulse detector elements, to which a plurality of partial reference-pulse signals $REF_1$ to $REF_4$ are applied, and from whose processing reference-pulse signal REF is ultimately produced, which is explained in detail in the following.

Conventional photo elements may be used as reference-pulse detector elements 24 to 27.

Incremental signals INC and reference-pulse signals REF generated by the position-measuring device are finally made available to a downstream evaluation unit, e.g. a numerical machine-tool control, for further processing.

Figure 2:
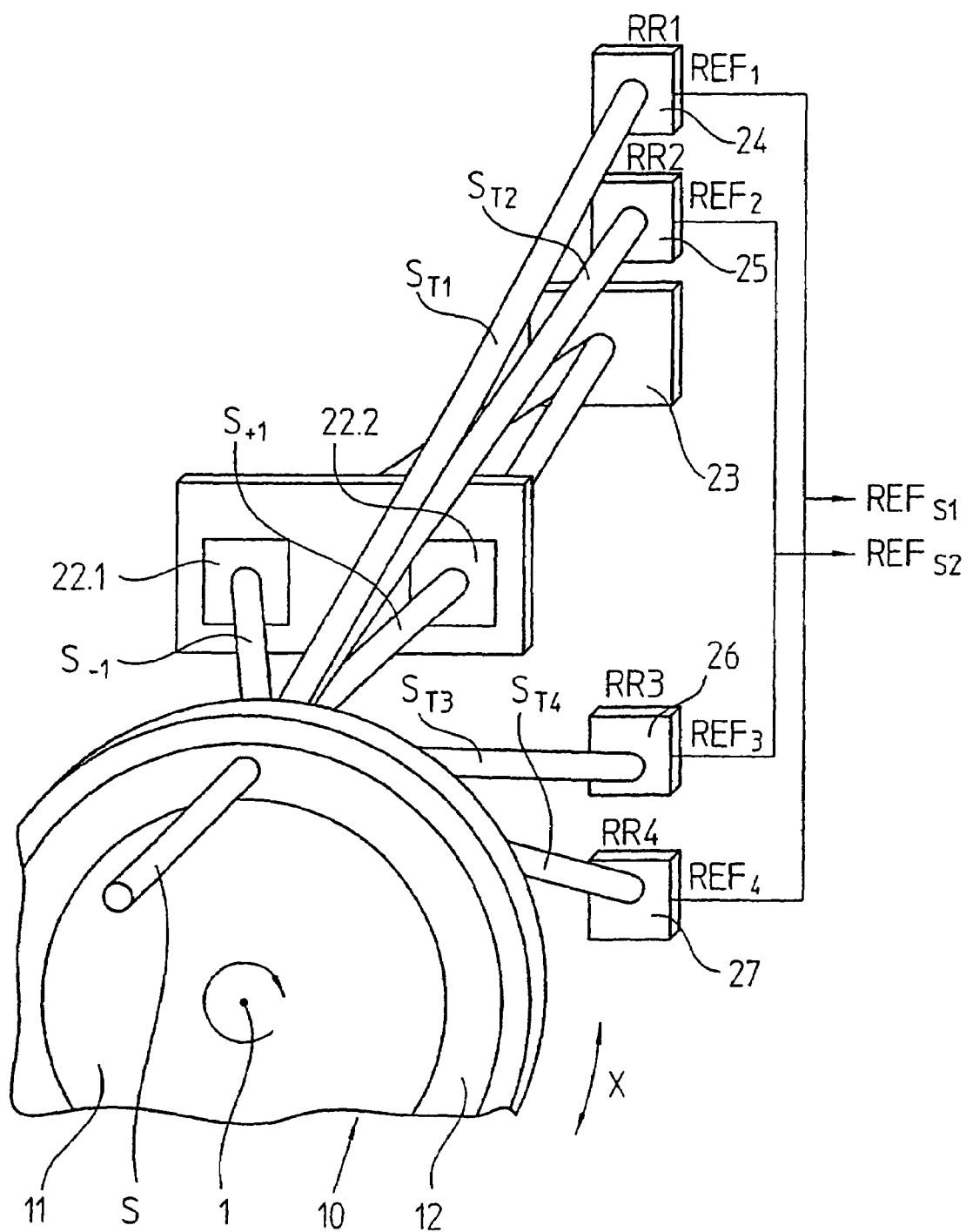
FIG. 2 shows a schematic spatial representation of the scanning beam path in the exemplary embodiment of FIG. 1.

Reference is now made to the description of the following figures for the detailed explanation of the generation of the reference-pulse signal according to an example embodiment of the present invention. FIG. 2 shows a perspective schematic representation of the various scanning beam paths in the position-measuring device according to an example embodiment of the present invention.

Beam of rays S coming from the light source strikes on scale 10, formed as a graduated disk, on track 12 having the incremental graduation. At this point, it should be mentioned that the incremental graduation may be illuminated using a collimated beam of rays S which merely has a small diameter. The incremental graduation is not shown in detail in FIG. 2. For this, reference is made to the following FIGS. 3a and 3b.

To generate incremental signals INC, incident beam of rays S is split by diffraction at the incremental graduation into two sub-beams of rays $S_{+1}$ and $S_{-1}$, which propagate in two different spatial directions. On sides of the scanning unit, the two sub-beams of rays $S_{+1}$ and $S_{-1}$ strike on one scanning graduation 22.1, 22.2, each. Sub-beams of rays $S_{+1}$ and $S_{-1}$ are deflected again by diffraction by scanning graduations 22.1, 22.2, and brought to interference in a detection plane in which incremental-signal detector element 23 is disposed. In the case of the relative movement of the scale and the scanning unit, that is to say, in the case of the rotation about axis of rotation 1, a periodically modulated incremental signal INC which may be further processed in a conventional manner is present at incremental-signal detector element 23.

In addition to periodic incremental signals INC, the present measures also make it possible to generate a reference-pulse signal REF at at least one location or reference position $x_{REF}$ along measurement path d. With the aid of reference-pulse signal REF, the absolute reference during the measurement may be produced, to which the subsequent incremental measurement is then specific.

For this purpose, a specific formation of the incremental graduation is provided, in order to generate a reference-pulse signal by a discontinuity with respect to an optical property at at least one location or reference position. For further clarification, reference is also made at this point to FIGS. 3a and 3b which show a plan view of scale 10 and a sectional enlargement of the same at reference position $x_{REF}$.

Basically, the incremental graduation in the position-measuring device is made up of subregions TB1, TB2 having different optical properties and arranged periodically with incremental graduation period $TP_{INC}$ in measuring direction x. Subregions TB1, TB2 have a longitudinal extension in a direction y that is oriented perpendicular to measuring direction x.

Moreover, in the present example, the incremental graduation in a first section $D_1$ of the measurement path has a first transverse substructure which deflects beams of rays striking it into at least a first spatial direction. In the exemplary embodiment shown in FIGS. 2, 3a and 3b, first section $D_1$ extends over the left 180° circle segment of the graduated disk or incremental graduation. In a second section $D_2$ which borders on first section $D_1$, the incremental graduation has a second transverse substructure which deflects incident beams of rays into at least a second spatial direction. The second spatial direction is different from the first spatial direction. Therefore, in the example shown, the right 180° circle segment of the incremental graduation represents second section $D_2$ of the measurement path. Thus, in the junction region between first and second sections $D_1$ and $D_2$, a discontinuity with respect to the optical deflection action of the respective transverse substructures of the incremental graduation exists, which is ultimately utilized for generating a reference-pulse signal REF at this location.

Figure 3B:
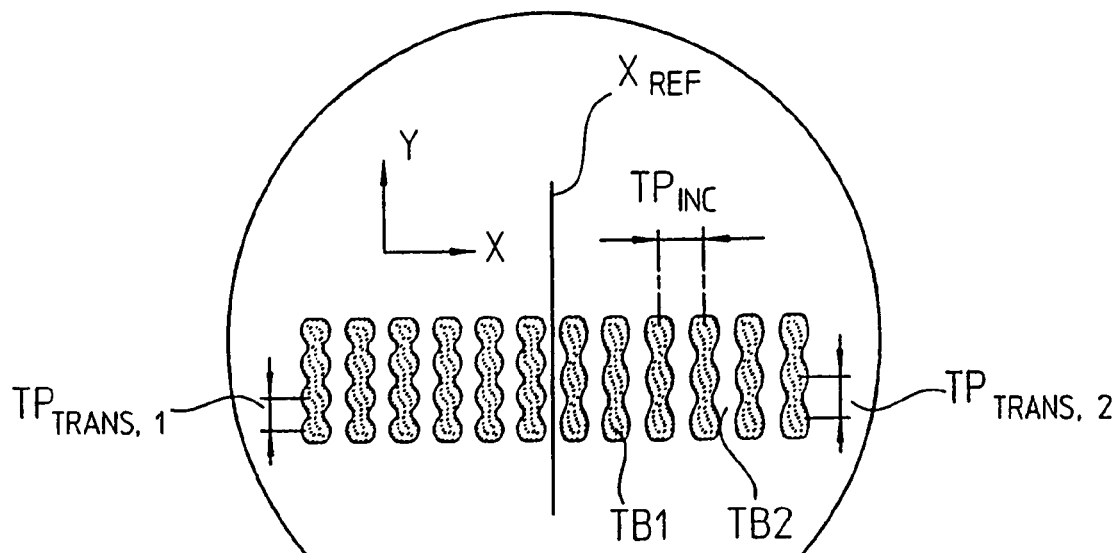
FIGS. 3a and 3b each show a plan view of the scale from FIG. 1.

The transverse substructures in the incremental graduation are each formed as periodic structures having a defined deflection graduation period $TP_{TRANS.1}$, $TP_{TRANS.2}$ along direction y of the longitudinal extension of subregions TB1, TB2, as illustrated in FIG. 3b. The first transverse substructure in first section $D_1$ has a first deflection graduation period $TP_{TRANS.1}$; the second transverse substructure in the second section has a second deflection graduation period $TP_{TRANS.2}$ which differs from first deflection graduation period $TP_{TRANS.1}$.

As the representation in FIG. 2 shows, the transverse substructure in first section $D_1$ of the measurement path deflects incident beams of rays S into a first spatial direction RR1. The beams of rays deflected into first spatial direction RR1 are designated by reference symbol $S_{T1}$. The transverse substructure in second section $D_2$ of the measurement path deflects incident beams of rays S into a second spatial direction RR2. The beams of rays deflected into second spatial direction RR2 are designated by reference symbol $S_{T2}$. Beams of rays $S_{T1}$, $S_{T2}$ deflected into the two spatial directions RR1, RR2 are represented in FIG. 2 for illustration, which, in practice, may only occur in the junction region between the two sections $D_1$ and $D_2$.

Arranged in the two spatial directions RR1 and RR2 are reference-pulse detector elements 24, 25, respectively, which detect the beams of rays deflected into these spatial directions RR1, RR2, and at which partial reference-pulse signals $REF_1$, $REF_2$ are present, by whose processing it is basically possible to generate reference-pulse signal REF.

In the following, the basic principle for generating reference-pulse signal REF at reference position $x_{REF}$ in the present example is explained.

As long as beam of rays S coming from the light source exclusively scans or passes through first section $D_1$ of the incremental graduation, the transverse substructure in this section effects only a deflection into first spatial direction RR1, that is, beam of rays $S_{T1}$ results which acts upon first reference-pulse detector element 24. In this measuring phase, only first reference-pulse detector element 24 registers an incident radiation intensity, and therefore a first partial reference-pulse signal $REF_1$ present at the output. In the case of the scanning of second section $D_2$ of the incremental graduation, exactly the opposite conditions exist, that is, only second reference-pulse detector element 25 in second spatial direction RR2 registers the incident radiation intensity of beam of rays $S_{T2}$, and second partial reference-pulse signal $REF_2$ is then present at its output. Thus, in the junction region between the two sections $D_1$ and $D_2$, respectively, at reference position $x_{REF}$, a characteristic signal pattern with respect to the two partial reference-pulse signals $REF_1$, $REF_2$ is available which may be utilized for generating a reference-pulse signal REF.

Figure 3A:
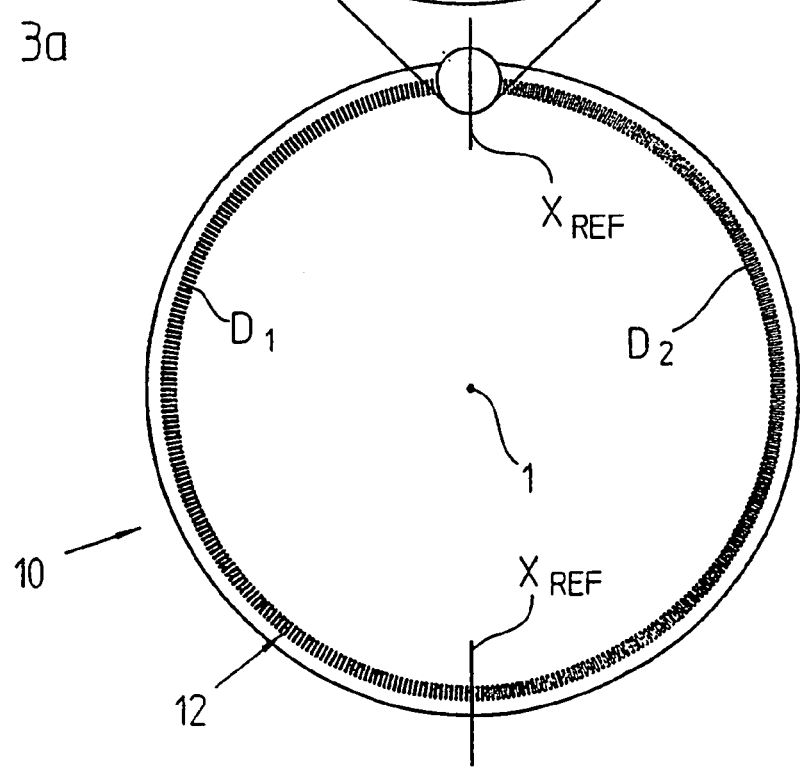

In the example in FIGS. 3a and 3b having the two sections $D_1$, $D_2$ of the measurement path, which in each case extend over the 180° circle segments, a reference-pulse signal REF may be generated in the same manner in the second junction region which is then disposed opposite the first junction region.

Provision may also be made to split up the specific measurement path into even more sections and, in each case, to generate reference-pulse signals at the junction regions between the various sections.

The deflecting transverse substructures of the incremental graduation used in the present example are formed as diffracting structures and in each case do not only bring about a deflection into first or second spatial direction RR1, RR2. In first section $D_1$, in addition to the deflection of beam of rays $S_{T1}$ into the first spatial direction, a deflection of beam of rays $S_{T4}$ into a fourth spatial direction RR4 also takes place, in which a reference-pulse-signal detector element 27 is arranged. Analogous thereto, in second section $D_2$, in addition to the deflection of beam of rays $S_{T2}$ into second spatial direction RR2, a deflection of a beam of rays $S_{T3}$ into a third spatial direction RR3, in which a reference-pulse-signal detector element 26 is arranged, also results. Thus, first and fourth spatial directions RR1, RR4, as well as, second and third spatial directions RR2, RR3 in each case correspond to the +1st and −1st diffraction orders, into which a corresponding deflection takes place by the respective transverse substructures of the two sections $D_1$, $D_2$. First and fourth reference-pulse detector elements 24, 27, as well as second and third reference-pulse detector elements 25, 26 are interconnected for the further signal processing.

As FIG. 2 shows, a plane is defined by the various spatial directions RR1 to RR4 into which a deflection of the beams of rays takes place, the plane being oriented perpendicular to measuring direction x and parallel to the direction of longitudinal extension y of the different subregions TB1, TB2 of the incremental graduation.

In the example described, the incremental graduation is formed as a transmitted-light graduation or phase grating. Therefore, subregions TB1 and TB2 discernible in FIG. 3b and arranged periodically with incremental-graduation period $TP_{INC}$ each exert a different effect on the transmitted beams of rays.

At this point, it should be pointed out that amplitude gratings or structures may also be used as an alternative within the scope of the present invention. It is possible to alternatively implement an incident-light system.

The transverse substructure of the incremental graduation is formed by a suitable arrangement of subregions TB1, TB2. For example, they may have—as discernible in FIG. 3b—periodic, sinusoidal contour boundaries in the direction of their longitudinal extension, i.e., in the y-direction. The periodicity of the ideally sinusoidal contour boundaries corresponds to respective transverse deflection graduation periods $TP_{TRANS.1}$, $TP_{TRANS.2}$. Because of this transverse substructure, in addition to the deflection or splitting of the beams of rays, used for the incremental-signal generation, in measuring direction x, the desired transverse deflection of beams of rays for generating reference-pulse signal REF also results. An aspect of a sinusoidal contour boundary is that it may ensure that the intensity of the incremental signal is only slightly impaired by the generation of the reference-pulse signal. The reason for this is the low field strength of the +/−1st longitudinal diffraction orders at the locations of the transverse grating structures. The extension of the sinusoidal contour boundaries in measuring direction x, i.e., the modulation amplitude of the sine function determines the distribution proportion of the light intensities for the utilized sub-beams of rays of the reference-mark scanning and the incremental-signal scanning. This distribution proportion is set as desired by the selection of the modulation period of the sine function. In this context, care may be taken that, if at all possible, the distribution proportion set in this manner does not differ in the various subregions TB1 and TB2.

In addition to the example embodiment of a suitable transverse substructure in the incremental graduation presented in the example of FIG. 3b, alternative variants may also be provided.

Thus, for example, a periodic transverse substructure may be used, where the subregions of the incremental graduation have triangular contour boundaries along the y-direction.

Furthermore, the modulation amplitude of the contour boundary may be selected to be so large that adjacent transverse substructures in the measuring direction touch, and thus a cross grating having rhombic structures may result.

Moreover, in the respective subregions of the incremental graduation, cylindrical lenses may also be used as substructures deflecting transversely to measuring direction x. Such cylindrical lenses may also be employed for focusing the transversely deflected diffraction orders onto small detector elements. In this context, the zeroth diffraction orders utilized for generating the incremental signal are not focused or defocused.

In an example embodiment of the present invention, incremental graduation period $TP_{INC}=4$ μm and the two transverse deflection graduation periods $TP_{TRANS.1}=3.5$ μm, $TP_{TRANS.2}=4.5$ μm are selected. These parameters may also be selected in another manner and adapted to the specific scanning configuration.

In example embodiments for the clarified example, reference-pulse signals may also be generated at more than two reference positions along the specific measurement path. The generation of so-called distance-coded reference marks is also possible, etc.

In addition, more than just two differently deflecting transverse structures may also be used. Thus, for instance, particularly in the case of a plurality of generated reference-pulse signals, in this manner a clear coding or identification of the respective reference-pulse signals may also be implemented along the measurement path. In this case, a specific junction between differently deflecting transverse substructures may be clearly assigned to each reference position, etc.

At this point, it should be mentioned that within the present exemplary embodiment, it is also possible to continually generate information which indicates on precisely which side of a reference position the scanning unit is located or in exactly which region of the measurement path the scanning unit is located. This may be accomplished by the readout of the respective reference-pulse signal detector elements 24, 25, 26, 27. Thus, in the example explained above, in the case of an exclusively detected first partial reference-pulse signal REF, the scanning unit is in first section $D_1$. Analogous thereto, in the case of an exclusively detected second partial reference-pulse signal $REF_2$, the scanning unit is in second section $D_2$, etc. Therefore, partial reference-pulse signals $REF_1$, $REF_2$ may also be evaluated as so-called region signals.

With reference to FIGS. 4a to 4c and 5, in the following, it is clarified from a first variant how, in the present example, desired reference-pulse signal REF is ultimately produced from partial reference-pulse signals $REF_1$ to $REF_4$ generated.

Figure 4A:
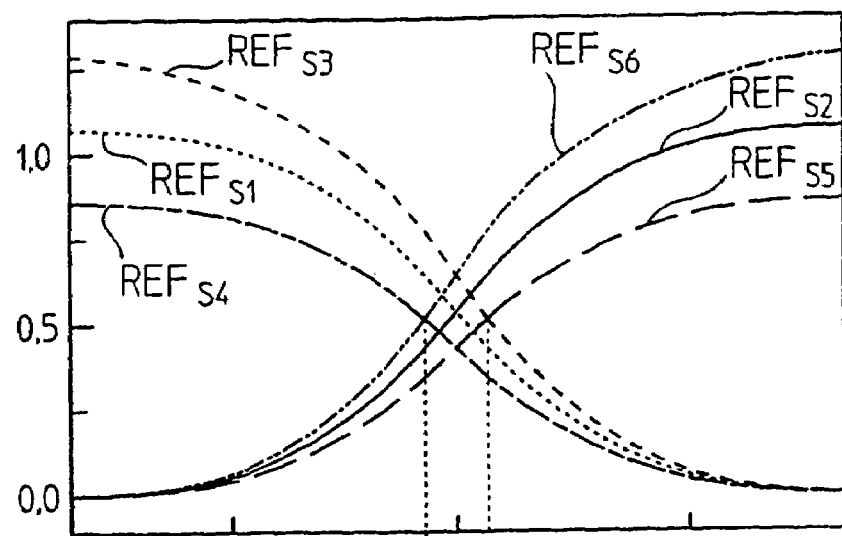
FIGS. 4a to 4c show various signal diagrams, based upon which a first variant of the generation of the reference-pulse signal according to an example embodiment of the present invention is clarified.
Figure 5:
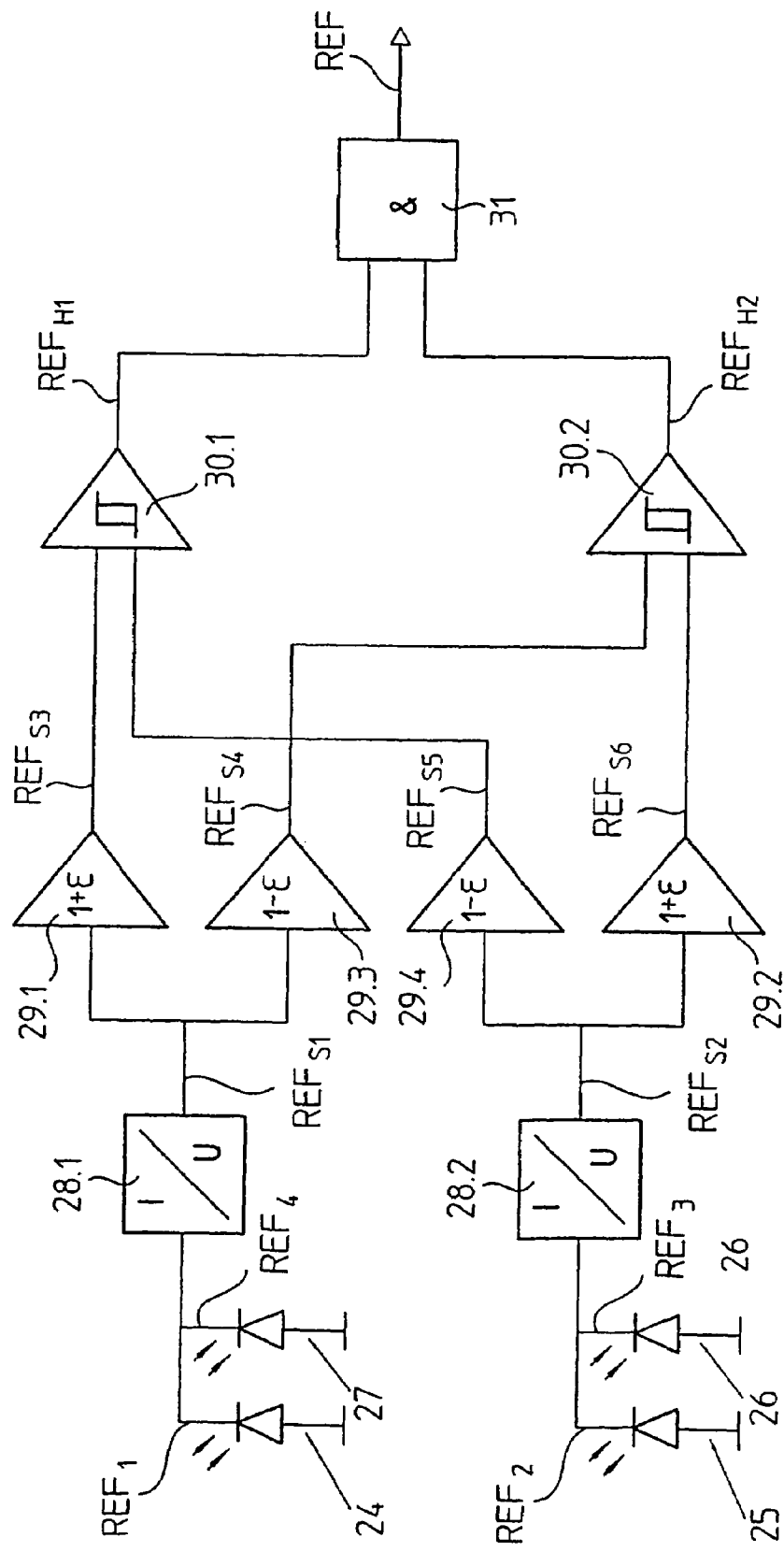
FIG. 5 shows a block diagram to clarify the first variant for producing the reference-pulse signal.

As is clear from FIG. 5, in this example embodiment, first and fourth reference-pulse detector elements 24, 27 arranged in the first and fourth spatial direction are interconnected so that a first reference-pulse composite signal $REF_{S1}$ results at the output of a first downstream current-to-voltage converter 28.1. Analogous thereto, second and third reference-pulse detector elements 25, 26 arranged in the second and third spatial direction are interconnected so that a second reference-pulse composite signal $REF_{S2}$ results at the output of downstream second current-to-voltage converter 28.2. FIG. 4a shows the pattern of both reference-pulse composite signals $REF_{S1}$, $REF_{S2}$ in the region of reference position $x_{REF}$.

As illustrated in FIG. 4a, without further additional measures, information may already be gained from first and second reference-pulse composite signals $REF_{S1}$, $REF_{S2}$ as to precisely on which side of reference position $x_{REF}$ the scanning unit is located.

Therefore, the two first and second reference-pulse composite signals $REF_{S1}$, $REF_{S2}$ may also be evaluated as region signals. As long as first reference-pulse composite signal $REF_{S1}$ is larger than second reference-pulse composite signal $REF_{S2}$, in the present example, the scanning unit is therefore to the left of reference position $x_{REF}$. On the other hand, if first reference-pulse composite signal $REF_{S1}$ is smaller than second reference-pulse composite signal $REF_{S2}$, the scanning unit is located to the right of reference position $x_{REF}$, etc.

At this point, it should be mentioned that basically, in each case only one of the two reference-pulse detector elements 24 or 27, and of reference-pulse detector elements 25, 26, respectively, may be necessary to generate a reference-pulse signal REF in the manner set forth herein. The use in each instance of two reference-pulse detector elements and their corresponding interconnection according to FIG. 5, in this example may ensure increased signal intensity and improved insensitivity to interference effects.

The two first and second reference-pulse composite signals $REF_{S1}$, $REF_{S2}$ are subsequently amplified with the aid of two amplifier units 29.1, 29.2, respectively, using a predefined amplification factor $V=(1+\epsilon)$, so that third and sixth reference-pulse composite signals $REF_{S3}$, $REF_{S6}$ are present at the output of the two amplifier units 29.1, 29.2. Moreover, both reference-pulse composite signals $REF_{S1}$, $REF_{S2}$ are attenuated with a predefined attenuation factor $A=(1-\epsilon)$ via two attenuator units 29.3, 29.4, so that fourth and fifth reference-pulse composite signals $REF_{S4}$, $REF_{S5}$ are present at the output of the two attenuator units 29.3, 29.4. FIG. 4a shows the resulting pattern of third to sixth reference-pulse composite signals $REF_{S3}$ to $REF_{S6}$ in the region of reference position $x_{REF}$.

Two reference-pulse auxiliary signals $REF_{H1}$, $REF_{H2}$ are thereupon formed from various reference-pulse composite signals $REF_{S3}$ to $REF_{S6}$ by subsequent logic operations. For this purpose, third and fifth reference-pulse composite signals $REF_{S3}$, $REF_{S5}$ are supplied to the two inputs of a first comparator unit 30.1, and fourth and sixth reference-pulse composite signals $REF_{S4}$, $REF_{S6}$ are supplied to the inputs of a second comparator unit 30.2. Present at the output of the two comparator units 30.1, 30.2 are the two reference-pulse auxiliary signals $REF_{H1}$, $REF_{H2}$, whose pattern in the region of reference position $x_{REF}$ is represented in FIG. 4b.

With the aid of comparator units 30.1, 30.2, the two reference-pulse auxiliary signals $REF_{H1}$, $REF_{H2}$ are generated from the four amplified and attenuated reference-pulse composite signals $REF_{S3}$ to $REF_{S6}$ present on the input side on the basis of the following comparison operations:

$REF_{H1}=1$ when $REF_{S3}>REF_{S5}$, and $REF_{H1}=0$ when $REF_{S3}<REF_{S5}$ and $REF_{H2}=1$ when $REF_{S6}>REF_{S4}$, and $REF_{H2}=0$ when $REF_{S6}<REF_{S4}$ From the two reference-pulse auxiliary signals $REF_{H1}$, $REF_{H2}$ formed in this manner, by a logic AND-operation with the aid of logic element 31, reference-pulse signal REF is finally generated which then results as a square-wave signal having a specific width $b_{REF}$. FIG. 4c shows the square-wave signal resulting in this manner.

Figure 4B:
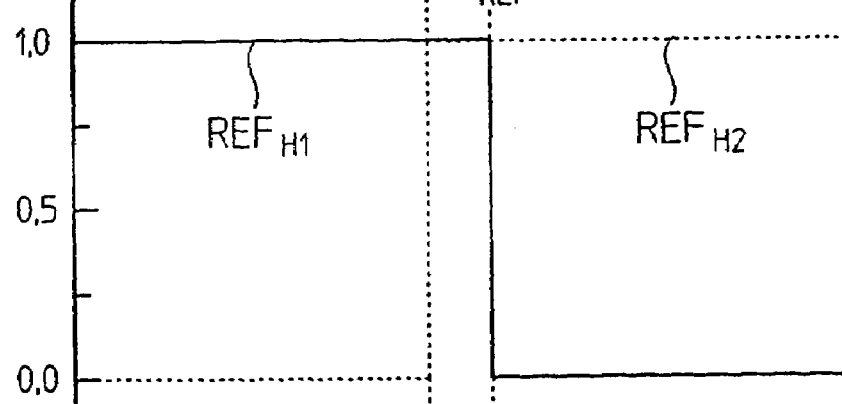
Figure 4C:
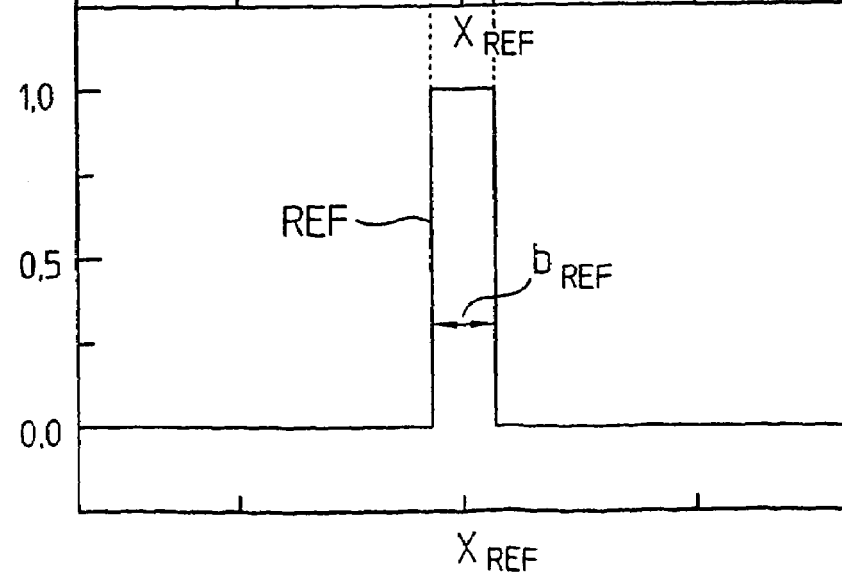

As illustrated in FIGS. 4a to 4c, when generating a reference-pulse signal REF, resulting width $b_{REF}$ of reference-pulse signal REF may be set in a defined manner by the suitable selection of amplification factors V and attenuation factors A, respectively, and in this manner matched to the periodicity of the incremental signals generated concurrently.

In the example described, as explained above, the generated first to sixth reference-pulse composite signals may also function as so-called region signals which in each case clearly indicate the relative position of the scanning unit in relation to reference position $x_{REF}$. As already mentioned at the outset and as described in German Published Patent Application No. 41 11 873, basically such region signals may also be utilized for generating a reference-pulse signal. In this case, reference position $x_{REF}$ is defined by the junction region between first and second region signals. It is therefore recognized that, as was explained with reference to FIGS. 4a to 4c and 5, to generate a reference-pulse signal, region signals may basically also be utilized which were generated alternatively to the manner described above. Therefore, only first and second region signals, which in the region of reference position $x_{REF}$ have a signal pattern analogous to first and second reference-pulse-signal composite signals $REF_{S1}$, $REF_{S2}$ according to FIG. 4a, may be necessary for the method for operating a position-measuring device, particularly for generating a reference-pulse signal REF. Third and fourth region signals may be generated by the amplification and attenuation of at least one region signal. A reference-pulse signal may be generated by subsequently comparing the first, third or fourth region signal to the second region signal or region signals possibly derived therefrom.

In the method of an example embodiment of the present invention, the input-side region signals may also be processed in a manner analogous to the processing of the partial reference-pulse signals and reference-pulse composite signals, respectively. This means that in the present example, fifth and sixth region signals also result from the second region signal by attenuation and amplification, which then are compared to the first, third or fourth region signal in order to generate a reference-pulse signal.

The region signals are amplified and attenuated using defined amplification and attenuation factors. By their selection, the width of the resulting reference-pulse signal may ultimately be set, as explained above.

As a requirement with respect to the region signals to be generated, it may merely be specified that the first and second region signals each have an unequivocal signal level in each of the two regions, that is to say, that the signal levels may be suitably differentiated as, for instance, is the case for first and second reference-pulse composite signals $REF_{S1}$, $REF_{S2}$ in the example above.

However, the first and second region signals may also be generated in an alternative manner to the example described above. Thus, for instance, the region signals may also be derived from a separate region track on the scale. For example, the region track in turn includes two sub-tracks, which are each formed in a manner complementary to one another, and, for example, is completely transparent on one side of reference position $x_{REF}$, while it is opaque in the region to the right of reference position $x_{REF}$. Each of the two sub-tracks is scanned by a detector element for generating the region signals, so that region signals having the necessary pattern in the region of reference position $x_{REF}$ may also be generated when working with such an arrangement of the scale and scanning unit.

A second variant for generating a reference-pulse signal is clarified in the following with reference to FIGS. 6, 7 and 8a to 8c.

Figure 6:
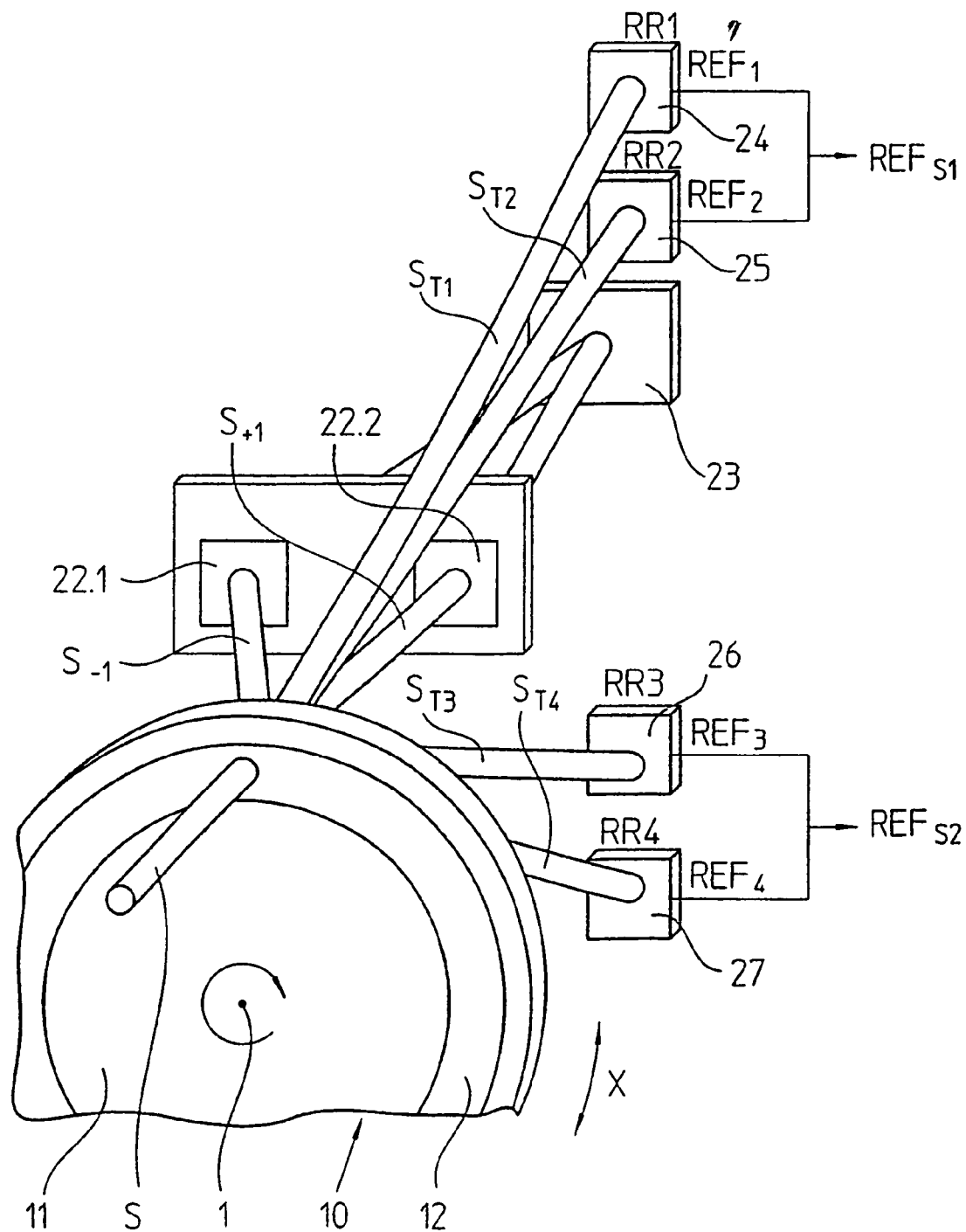
FIG. 6 shows a schematic spatial representation of the scanning beam path of a further exemplary embodiment to clarify a second variant for producing the reference-pulse signal.

FIG. 6 shows the device as was already basically explained in FIG. 2. Therefore, in the following, only the differences with respect to the example embodiment described above are discussed. To this end, reference is also made to FIG. 7 which shows a block diagram with respect to the interconnection. In contrast to the example above, first and second reference-pulse detector elements 24, 25, i.e., respective partial reference-pulse signals $REF_1$, $REF_2$ —respective region signals—are interconnected, so that a first reference-pulse composite signal $REF_{S1}$ is present at the output of a first downstream current-to-voltage converter 128.1. Analogous thereto, third and fourth reference-pulse-signal detector elements 26, 27, i.e., respective partial reference-pulse signals $REF_3$, $REF_4$ —respective region signals—are interconnected so that at the output of downstream second current-to-voltage converter 128.2, a signal results that in the following, is designated as second reference-pulse composite signal $REF_{S2}$. Signal $REF_{S2}$ is a signal that is essentially proportional to the sum of signals $REF_3$ and $REF_4$ and may also be designated as a reference-pulse dc or steady radiation signal. The two signals $REF_{S1}$, $REF_{S2}$ are amplified with the aid of amplifier units 129.1, 129.2 downstream of current-to-voltage converters 128.1, 128.2, respectively. Present at the output of the two amplifier units 129.1, 129.2 are amplified first and second signals $REF_S$ and $REF_G$, respectively, whose pattern in the region of reference position $x_{REF}$ is represented in FIGS. 8a and 8b.

Figure 8A:
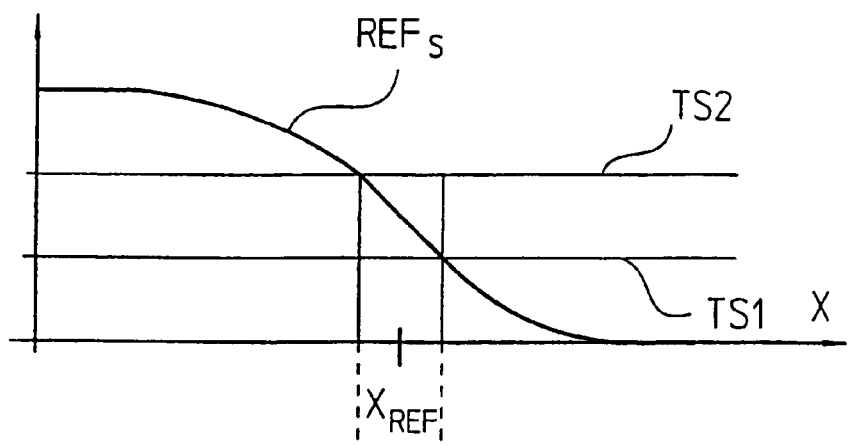
FIGS. 8a to 8c show various signal diagrams, based upon which a second variant of the generation of the reference-pulse signal according to the an example embodiment of the present invention is clarified.
Figure 8B:
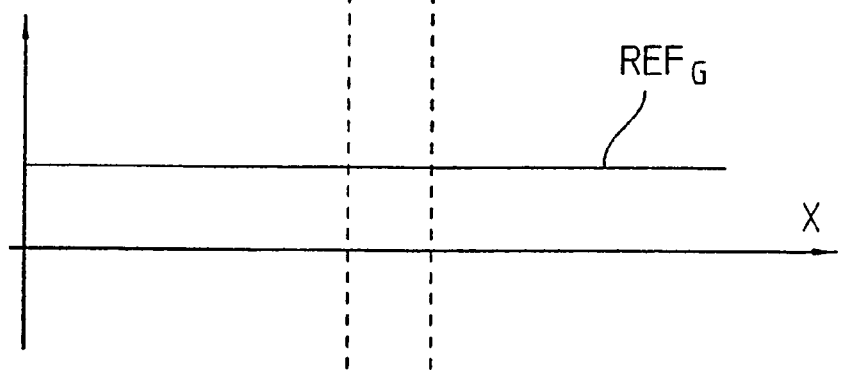
Figure 8C:
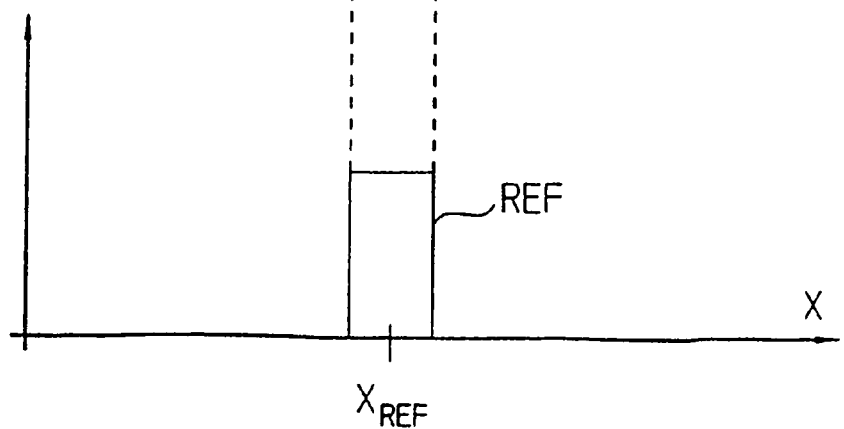

As illustrated in FIG. 8b, signal $REF_G$ essentially exhibits a constant signal level, while the signal level of signal $REF_S$ changes sharply in the region of reference position $x_{REF}$. Therefore, to generate desired reference-pulse signal REF, two trigger or reference signals TS1, TS2 are derived from signal $REF_G$, each having a constant signal level, which are shown in FIG. 8a and which are used for producing actual reference-pulse signal REF at the intersections with signal $REF_S$. Resulting signal REF is depicted in FIG. 8c.

Figure 7:
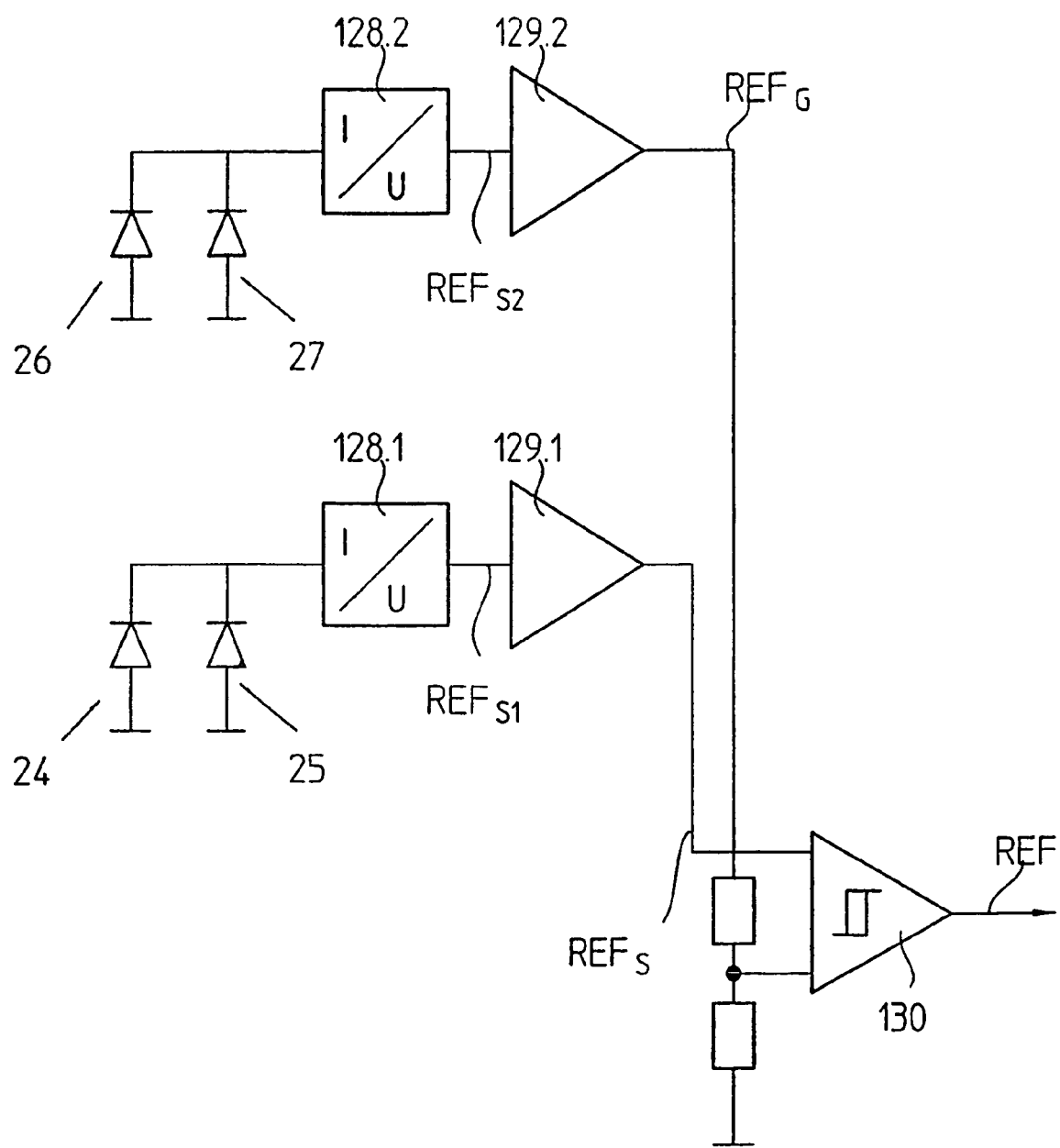
FIG. 7 shows a block diagram to clarify the second variant for producing the reference-pulse signal.

The implementation of this example embodiment for generating reference-pulse signal REF from the standpoint of circuit engineering is shown in FIG. 7. Thus, reference-pulse signal REF results at the output of comparator unit 130, to whose inputs signals $REF_G$ and $REF_S$ are applied. Comparator unit 130 may be constructed in a conventional manner, for example, as a window comparator, the window width and therefore the position of both trigger signals TS1, TS2 being determined from the specific level of applied signal $REF_G$.

Further alternative example embodiment possibilities exist in addition to the exemplary embodiments described.

Thus, it may be possible, for instance, in the first example described to amplify and attenuate only first generated reference-pulse composite signal $REF_{S1}$, and to subsequently generate a reference-pulse signal of defined width by logic comparison operations with the second, unchanged reference-pulse composite signal.

Furthermore, the two reference-pulse auxiliary signals may also be produced by the logic comparison of other signal combinations, etc.

What is claimed is:

1. A position-measuring device for generating periodic incremental signals and at least one reference-pulse signal, comprising:

a scale including a track extending in a measuring direction, a periodic incremental graduation arranged in the track, the periodic incremental graduation including a specific incremental graduation period, the track including, in at least one defined reference position, a discontinuity with respect to an optical property to generate a reference-pulse signal; and a scanning unit, one of (a) the scale and (b) the scanning unit movable with respect to the other one of (a) the scale and (b) the scanning unit in the measuring direction over a specific measurement path, the scanning unit including a light source and a plurality of detector elements configured to photoelectrically scan the incremental graduation;

wherein in a first section of the measurement path, the incremental graduation includes a first transverse substructure configured to deflect incident radiation into at least a first spatial direction, and in a second section of the measurement path, the incremental graduation includes a second transverse substructure configured to deflect incident radiation into at least a second spatial direction different from the first spatial direction, the discontinuity with respect to optical deflection action of the transverse substructures of the incremental graduation resulting in a junction region between the first section and the second section; and wherein the plurality of detector elements includes at least one reference-pulse detector element arranged on at least one side of the scanning unit in the spatial directions and arranged to receive partial reference-pulse signals, the partial reference-pulse signals processed to yield the reference-pulse signal.

2. The position-measuring device according to claim 1, wherein the incremental graduation includes subregions having different optical properties and arranged periodically with the incremental-graduation period in the measuring direction, the subregions including a longitudinal extension in a direction oriented perpendicular to the measuring direction, each transverse substructure arranged as a periodic structure having a defined deflection graduation period along the direction of longitudinal extension of the subregions.

3. The position-measuring device according to claim 2, wherein the first transverse substructure includes a first deflection graduation period and the second transverse substructure includes a second deflection graduation period different from the first deflection graduation period.

4. The position-measuring device according to claim 2, wherein the subregions of the incremental graduation include sinusoidal contour boundaries in the direction of the longitudinal extension.

5. The position-measuring device according to claim 2, wherein the subregions of the incremental graduation include triangular contour boundaries in the direction of the longitudinal extension.

6. The position-measuring device according to claim 1, wherein the incremental graduation is arranged as a circle in a circumferential direction on a disk-shaped carrier element, the first section and the second section of the incremental graduation representing two adjacent circle segments.

7. The position-measuring device according to claim 6, wherein each of the circle segments extends over 180° and reference-pulse signals are generated at two reference positions opposite each other along the circumferential direction.

8. The position-measuring device according to claim 1, wherein the incremental graduation is arranged as a phase grating.

9. The position-measuring device according to claim 1, wherein the incremental graduation is arranged as a transmitted-light graduation.

10. The position-measuring device according to claim 1, wherein the radiation includes a collimated beam of light.

11. A position-measuring device for generating periodic incremental signals and at least one reference-pulse signal, comprising:
 a scale including a track extending in a measuring direction, a periodic incremental graduation arranged in the track, the periodic incremental graduation including a specific incremental graduation period, the track including, in at least one defined reference position, a discontinuity with respect to an optical property to generate a reference-pulse signal; and
 a scanning unit, one of (a) the scale and (b) the scanning unit movable with respect to the one of (a) the scale and (b) the scanning unit in the measuring direction over a specific measurement path, the scanning unit including a light source and a plurality of detector elements configured to photoelectrically scan the incremental graduation;
 wherein in a first section of the measurement path, the incremental graduation includes a first transverse substructure configured to deflect incident radiation into at least a first spatial direction, and in a second section of the measurement path, the incremental graduation includes a second transverse substructure configured to deflect incident radiation into at least a second spatial direction different from the first spatial direction, the discontinuity with respect to optical deflection action of the transverse substructures of the incremental graduation resulting in a junction region between the first section and the second section;
 wherein the plurality of detector elements includes at least one reference-pulse detector element arranged on at least one side of the scanning unit in the spatial directions and arranged to receive partial reference-pulse signals, the partial reference-pulse signals processed to yield the reference-pulse signal;
 wherein the incremental graduation includes subregions having different optical properties and arranged periodically with the incremental-graduation period in the measuring direction, the subregions including a longitudinal extension in a direction oriented perpendicular to the measuring direction, each transverse substructure arranged as a periodic structure having a defined deflection graduation period along the direction of longitudinal extension of the subregions; and
 wherein the first transverse substructure is configured to deflect incident radiation into the first spatial direction and into a fourth spatial direction different from the first spatial direction, and the second transverse substructure is configured to deflect incident radiation into the second spatial direction and into a third spatial direction different from the second spatial direction.

12. The position-measuring device according to claim 11, wherein the spatial directions form a plane oriented perpendicular to the measuring direction and parallel to the direction of the longitudinal extension of the subregions of the incremental graduation.

13. The position-measuring device according to claim 11, wherein one of (a) the first spatial direction and the fourth spatial direction and (b) the second spatial direction and the third spatial direction correspond to directions into which a diffraction into +/−1st diffraction orders result in accordance with the respective deflection graduation period of the transverse substructure.

14. The position-measuring device according to claim 11, wherein the detector elements include a first reference-pulse detector element and a fourth reference-pulse detector element arranged in the first spatial direction and the fourth spatial direction, the first reference-pulse detector element and the fourth reference-pulse detector element interconnected to form a first reference-pulse composite signal from applied first and fourth partial reference-pulse signals, the detector elements including a second reference-pulse detector element and a third reference-pulse detector element arranged in the second spatial direction and the third spatial direction, the second reference-pulse detector element and the third reference-pulse detector element interconnected to form a second reference-pulse composite signal from applied second and third partial reference-pulse signals, the reference-pulse signal resulting from processing of the first and second reference-pulse composite signals.

15. The position-measuring device according to claim 14, further comprising an arrangement configured to amplify and attenuate the first reference-pulse composite signal to form third and fourth reference-pulse composite signals and an arrangement configured to amplify and attenuate the second reference-pulse composite signal to form fifth and sixth reference-pulse composite signals, the reference-pulse signal resulting from logical interconnection of the third, fourth, fifth and sixth reference-pulse composite signals.

16. The position-measuring device according to claim 15, wherein two reference-pulse auxiliary signals result from logical interconnection of the third, fourth, fifth and sixth reference-pulse composite signals, a logical AND relationship of the reference-pulse auxiliary signals forming a reference-pulse signal in the form of a square-wave signal having a specific width.

17. The position-measuring device according to claim 11, wherein the detector elements include a first reference-pulse detector element and a second reference-pulse detector element arranged in the first spatial direction and the second spatial direction, the first reference-pulse detector element and the second reference-pulse detector element interconnected to form a first reference-pulse composite signal from applied first and second partial reference-pulse signals, and the detector elements include a third reference-pulse detector element and a fourth reference-pulse detector element arranged in the third spatial direction and the fourth spatial direction interconnected to form a second reference-pulse composite signal from applied third and fourth partial reference-pulse signals, the reference-pulse signal resulting from processing of the first and second reference-pulse composite signals.

18. The position-measuring device according to claim 17, further comprising an arrangement configured to amplify the first and second reference-pulse signals and to apply the first and second reference-pulse signals to inputs of a comparator unit configured to form the reference-pulse signal at an output.

19. A method for operating a position-measuring device, comprising:

deriving first and second region signals from a track on a scale, the region signals indicating a relative position of a scanning unit in relation to a reference position, one of (a) the scale and (b) the scanning unit movable with respect to the other one of (a) the scale and (b) the scanning unit over a measurement path, the reference position defined by a junction region between a first region signal and a second region signal;

amplifying and attenuating (i) the first region signal to form third and fourth region signals and (ii) the second region signal to form fifth and sixth region signals;

comparing one of the first, third, and fourth region signals and one of the second, fifth, and sixth region signals; and generating a reference-pulse signal at at least one reference position along the measurement path based on the comparing step;

wherein the reference-pulse signal is produced in the generating step by comparing one of the first, third and fourth region signals and one of the second, fifth, and sixth region signals.

20. The method according to claim 19, wherein each of the first and second region signals provide a definite signal level for each of the first and second regions.

21. The method according to claim 19, further comprising selecting defined amplification factors and attenuation factors for amplifying and attenuating the region signals.

22. The method according to claim 21, further comprising setting a width of the reference-pulse signal in accordance with the selecting step.

* * * * *